(12) United States Patent
Matsubara

(10) Patent No.: US 12,689,609 B2
(45) Date of Patent: Jul. 21, 2026

(54) COMMUNICATION SYSTEM

(71) Applicant: ROHM CO., LTD., Kyoto (JP)

(72) Inventor: Hideki Matsubara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 298 days.

(21) Appl. No.: 18/418,562

(22) Filed: Jan. 22, 2024

(65) Prior Publication Data

US 2024/0205187 A1    Jun. 20, 2024

Related U.S. Application Data

(63) Continuation of application No. PCT/JP2022/029752, filed on Aug. 3, 2022.

(30) Foreign Application Priority Data

Aug. 3, 2021    (JP) ................................. 2021-127713

(51) Int. Cl.
G06F 13/42          (2006.01)
H04L 12/40          (2006.01)
          (Continued)

(52) U.S. Cl.
CPC .......... H04L 61/5038 (2022.05); G06F 13/42 (2013.01); H04L 12/40006 (2013.01);
          (Continued)

(58) Field of Classification Search
None
See application file for complete search history.

(56) References Cited

U.S. PATENT DOCUMENTS

| | | | | |
|---|---|---|---|---|
| 6,009,479 | A | * | 12/1999 | Jeffries ............... G06F 12/0661 |
| | | | | 711/E12.086 |
| 2012/0271924 | A1 | * | 10/2012 | Spitaels .............. H04L 61/5092 |
| | | | | 709/220 |
| 2019/0129878 | A1 | * | 5/2019 | Van Der Zande .. H04L 61/5038 |

FOREIGN PATENT DOCUMENTS

| | | |
|---|---|---|
| JP | H09-274539 | 10/1997 |
| JP | 2012-238989 | 12/2012 |
| JP | 2014-078226 | 5/2014 |

OTHER PUBLICATIONS

International Search Report and Written Opinion in International Appln. No. PCT/JP2022/029752, mailed on Nov. 1, 2022, 15 pages (with machine translation).

(Continued)

*Primary Examiner* — Michael Sun
(74) *Attorney, Agent, or Firm* — Fish & Richardson P.C.

(57) ABSTRACT

A communication system is configured to be capable of executing an address assignment process including: a first process for detecting presence/absence of an identification current input by means of an identification current detection unit when a constant current supply has generated an identification current output with a switch and a second transistor in an off state; and a second process for repeatedly executing the first process while, with respect to a slave among the slaves that has had the identification current input detected therein, stopping generation of the identification current output thereafter, and assigning an address to a single slave among the slaves that has not had the identification current input detected therein, and is also configured to be capable of executing the address assignment process while excluding a slave among the slaves that has had the address assigned thereto.

10 Claims, 13 Drawing Sheets

(51) Int. Cl.
H04L 61/5038 (2022.01)
H04L 61/5046 (2022.01)

(52) U.S. Cl.
CPC ............................... H04L 61/5046 (2022.05);
*H04L 2012/40234* (2013.01); *H04L 2012/40273* (2013.01)

(56) References Cited

OTHER PUBLICATIONS

JP OA—Japanese Patent Office, Office Action in Japanese Appln. No. 2023-540376, dated May 26, 2026, 10 pages (with English Translation).

* cited by examiner

COMMUNICATION SYSTEM

CROSS-REFERENCE TO RELATED APPLICATIONS

This nonprovisional application is a continuation application of International Patent Application No. PCT/JP2022/029752 filed on Aug. 3, 2022, which claims priority Japanese Patent Application No. 2021-127713 filed on Aug. 3, 2021, the entire contents of which are hereby incorporated by reference.

TECHNICAL FIELD

The present disclosure relates to a communication system.

BACKGROUND ART

A conventionally known communication system includes a plurality of control devices connected via a bus. A communication system compliant with LIN (Local Interconnect Network), for example, adopts a master-slave system that includes a control device as a master node and a control device as a slave node, and in which the master node controls the entire communication (see, for example, Patent Document 1 identified below).

CITATION LIST

Patent Literature

Patent Document 1: Japanese Unexamined Patent Application Publication No. 2012-238989

BRIEF DESCRIPTION OF DRAWINGS

FIG. 4 is a diagram showing a specific example of the address assignment process (address assignment executed for a first time).

Figure 5:
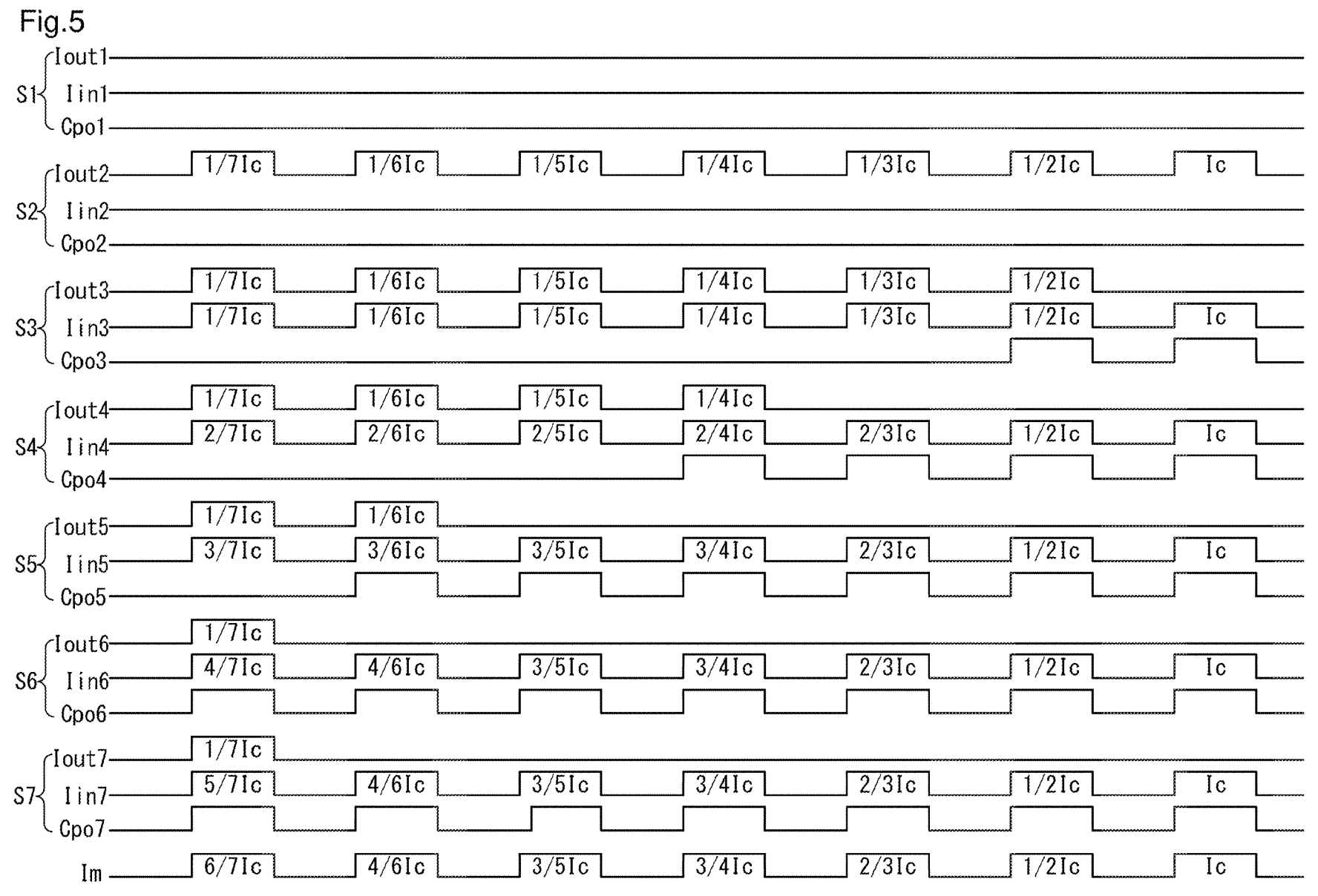

FIG. 5 is a diagram showing a specific example of the address assignment process (address assignment executed for a second time).

DESCRIPTION OF EMBODIMENTS

Hereinafter, exemplary embodiments of the present disclosure will be described with reference to the accompanying drawings.

1. Comparative Example

Figure 13:
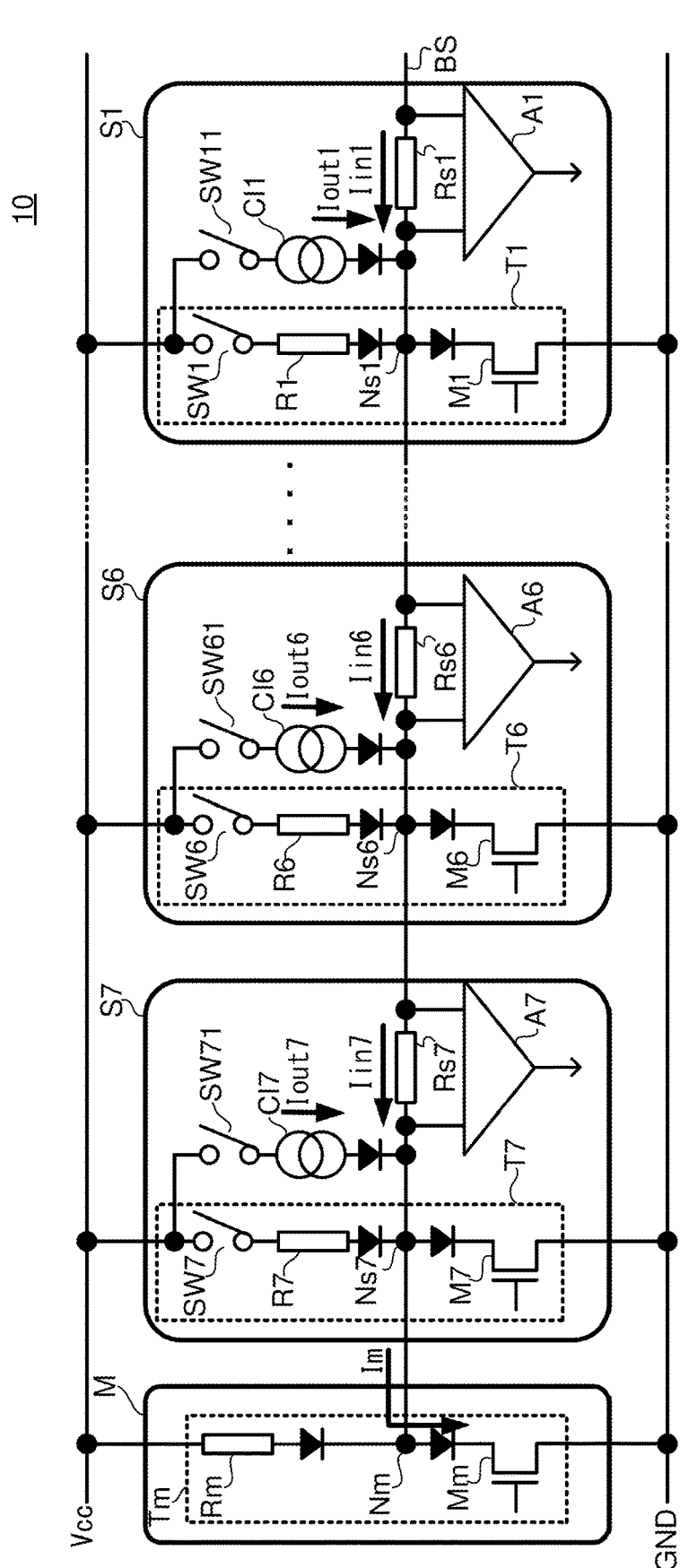
FIG. 13 is a diagram showing a configuration of a communication system according to a comparative example.

First, before describing embodiments of the present disclosure, a description will be given of a comparative example for comparison with the embodiments of the present disclosure. FIG. 13 is a diagram showing a configuration of a communication system 10 according to the comparative example. The communication system 10 shown in FIG. 13 is a system compliant with LIN, and adopts a master-slave system.

The communication system 10 includes a control device (a master node) as a master M, and a plurality of control devices (slave nodes) as slaves S7 to S1. Note that the number of the slaves is seven here as an example, but the number is not limited to seven, and can be any number that is equal to or larger than two. The slaves S7 to S1 are connected to the master M via a bus BS in order from a side (hereinafter, the pre-stage side) that is close to the master M to a side (hereinafter, the post-stage side) that is far from the master M.

The master M includes a transmitter Tm. Note that the master M also includes, in addition to the transmitter Tm, a receiver and a microcontroller, of which neither is illustrated. Here, instead of the microcontroller, a hard logic circuit or the like may be used. The transmitter Tm includes a pull-up resistor Rm and a transistor Mm. One end of the pull-up resistor Rm is connected to an application end of a power supply voltage Vcc. The other end of the pull-up resistor Rm is connected to a drain of the transistor Mm which is an NMOS transistor (an N-channel MOSFET). A source of the transistor Mm is connected to an application end of a ground potential GND. In short, the pull-up resistor Rm and the transistor Mm are connected in series between the power supply voltage Vcc application end and the ground potential GND application end. A node Nm at which the pull-up resistor Rm and the transistor Mm are connected is connected to the bus BS. Note that, between the pull-up resistor Rm and the node Nm, a diode is connected with its cathode side on the side of the node Nm, and that, between the node Nm and the transistor Mm, a diode is connected with its anode side on the side of the node Nm.

By the transistor Mm having its on/off controlled by the unillustrated microcontroller, a signal at low level (GND) or at high level (Vcc) is generated at the node Nm. Thereby, the transmitter Tm is capable of transmitting data to the slaves S7 to S1. Further, the unillustrated receiver is connected to the node Nm, and is capable of receiving data transmitted from the slaves S7 to S1.

The slaves S7 to S1 each include a corresponding one of transmitters T7 to T1, a corresponding one of switches SW71 to SW11, a corresponding one of constant current supplies CI7 to CI1, a corresponding one of sense resistors Rs7 to Rs1, and a corresponding one of amplifiers A7 to A1. The slaves S7 to S1 also each include a receiver and a microcontroller, of which neither is illustrated. Here, a hard logic circuit or the like may be used instead of the microcontroller.

The transmitters T7 to T1 each include a corresponding one of switches SW7 to SW1, a corresponding one of pull-up resistors R7 to R1, and a corresponding one of transistors M7 to M1. One end of each of the switches SW7 to SW1 is connected to the application end of the power supply voltage Vcc. The other end of each of the switches SW7 to SW1 is connected to one end of a corresponding one of the pull-up resistors R7 to R1. The other end of each of the pull-up resistors R7 to R1 is connected via a corresponding one of nodes Ns7 to Ns1 to the bus BS. The nodes Ns7 to Ns1 are each connected to a drain of a corresponding one of the transistors M7 to M1 which are NMOS transistors. A source of each of the transistors M7 to M1 is connected to the application end of the ground potential GND. Note that, between each of the pull-up resistors R7 to R1 and a corresponding one of the nodes Ns7 to Ns1, a diode is connected with its cathode side on the side of the corresponding one of the nodes Ns7 to Ns1, and that, between each of the nodes Ns7 to Ns1 and a corresponding one of the transistors M7 to M1, a diode is disposed with its anode side on the side of the corresponding one of the nodes Ns7 to Ns1.

With the switches SW7 to SW1 in an on state, by controlling on/off of the transistors M7 to M1 by means of the unillustrated microcontrollers, a signal at low level (GND) or high level (Vcc) is generated at a corresponding one of the nodes Ns7 to Ns1. Thereby, each of the slaves S7 to S1 is capable of transmitting data to the master M or to other slaves. Note that the unillustrated receivers are each connected to a corresponding one of the nodes Ns7 to Ns1, and thus is capable of receiving data transmitted from the master M or from other slaves.

The switches SW71 to SW11 and the constant current supplies CI7 to CI1 are each disposed between the application end of the power supply voltage Vcc and the bus BS. As a result, in a case where the switches SW71 to SW11 are in the on state, it is possible to generate identification current outputs Iout7 to Iout1 by means of the constant current supplies CI7 to CI1.

The sense resistors Rs7 to Rs1 are each disposed, in the bus BS, on the post-stage side of a corresponding one of the nodes at which the constant current supplies CI7 to CI1 are respectively connected to the bus BS. The amplifiers A7 to A1 each have a first input end that is connected to one end of a corresponding one of the sense resistors Rs7 to Rs1, and a second input end that is connected to the other end of the corresponding one of the sense resistors Rs7 to Rs1. In this manner, the amplifiers A7 to A1 each amplify a potential difference generated across the corresponding one of the sense resistors Rs7 to Rs1 as a result of identification current inputs Iin7 to Iin1 flowing in a corresponding one of the sense resistors Rs7 to Rs1.

In the communication system 10 having this configuration, address assignment with respect to the slaves S7 to S1 is executed by using the bus BS in the following manner. That is, the bus BS is used both in data communication and in address assignment.

First, in the slaves S7 to S1, the switches SW7 to SW1 are turned off to disable pull-up and to turn off the transistors M7 to M1, and then the switches SW71 to SW11 are turned on. At this time, in the master M, the transistor Mm is turned on. As a result, by the constant current supplies CI7 to CI1, the identification current outputs Iout7 to Iout1 are generated. The identification current outputs Iout7 to Iout1 all have the same current value Ic.

Then, the identification current inputs are respectively such that $Iin1=0$, $Iin2=Iout1+Iin1=Ic$, $Iin3=Iout2+Iin2=Ic\times$ $2, \ldots,$ and $Iin7=Iout6+Iin6=Ic\times6$, and a current Im that is drawn into the master M side from the slave S7 is such that $Im=Iout7+Iin7=Ic\times7$. At this time, the amplifier A1 detects that no current is flowing as the identification current input Iin1, and an address is assigned to the slave S1, in which the identification current input Iin1 is not flowing.

Next, with respect to the slaves S7 to S2, excluding the slave S1 to which an address has been assigned, process similar to the above process (generation of an identification current output) is performed. Thereby, an address is assigned to the slave S2, in which the identification current input Iin2 is not flowing.

Subsequently, the similar process is repeated until addresses are assigned to all the slaves.

In this address assignment process, the maximum value of the current Im drawn into the master M is a value (in the present example, $Ic\times7$) obtained by multiplying the current value of the identification current output by the number of slaves. Accordingly, in a case with a large number of slaves, the current Im has a large value, and this is undesirable, because there is a limit to an amount of current drawn into the master M. Moreover, if the value (Ic) of the identification current output is reduced to avoid increase of the current Im, the identification current input flowing in a slave on the post-stage side is reduced, and this makes it difficult to detect the identification current input.

To resolve such inconveniences, the following embodiments of the present disclosure have been invented.

2. Configuration of Communication System

Figure 1:
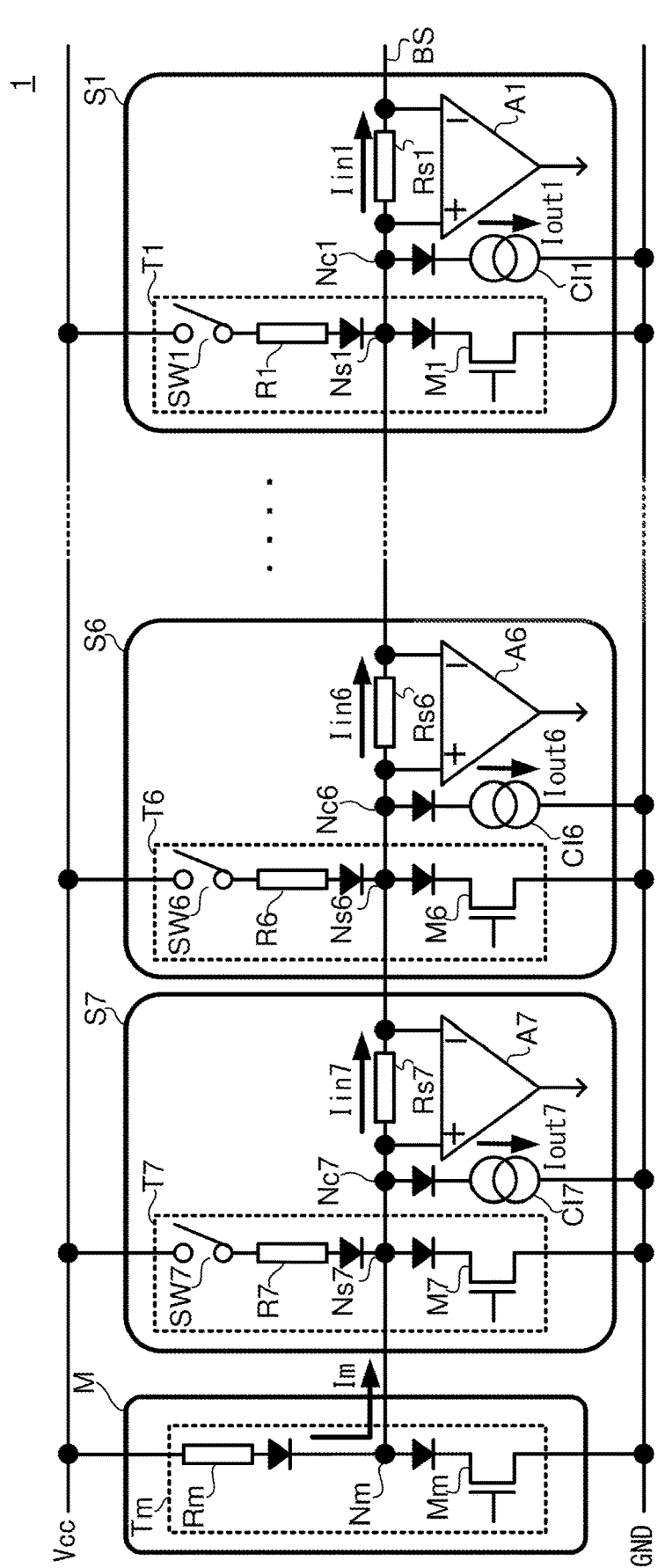
FIG. 1 is a diagram showing a configuration of a communication system according to an exemplary embodiment of the present disclosure.

FIG. 1 is a diagram showing a configuration of a communication system 1 according to an exemplary embodiment of the present disclosure. Similarly to the configuration of the above-described comparative example (FIG. 13), the communication system 1 shown in FIG. 1 includes the master M and the slaves S7 to S1. The communication system 1 has a configuration that is different from that of the above-described comparative example in arrangement of the constant current supplies CI7 to CI1 in the slaves S7 to S1. In the communication system 1, the constant current supplies CI7 to CI1 are disposed between the bus BS and the application end of the ground potential GND. Each of the sense resistors Rs7 to Rs1 is disposed on the post-stage side of a corresponding one of nodes Nc7 to Nc1 at which the constant current supplies CI7 to CI1 are connected to the bus BS. By the constant current supplies CI7 to CI1, the identification current outputs Iout7 to Iout1 are generated. Note that, between each of the nodes Nc7 to Nc1 and a corresponding one of the constant current supplies CI7 to CI1, a diode is disposed with its anode side on the side of the corresponding one of the nodes Nc7 to Nc1.

Figure 2:
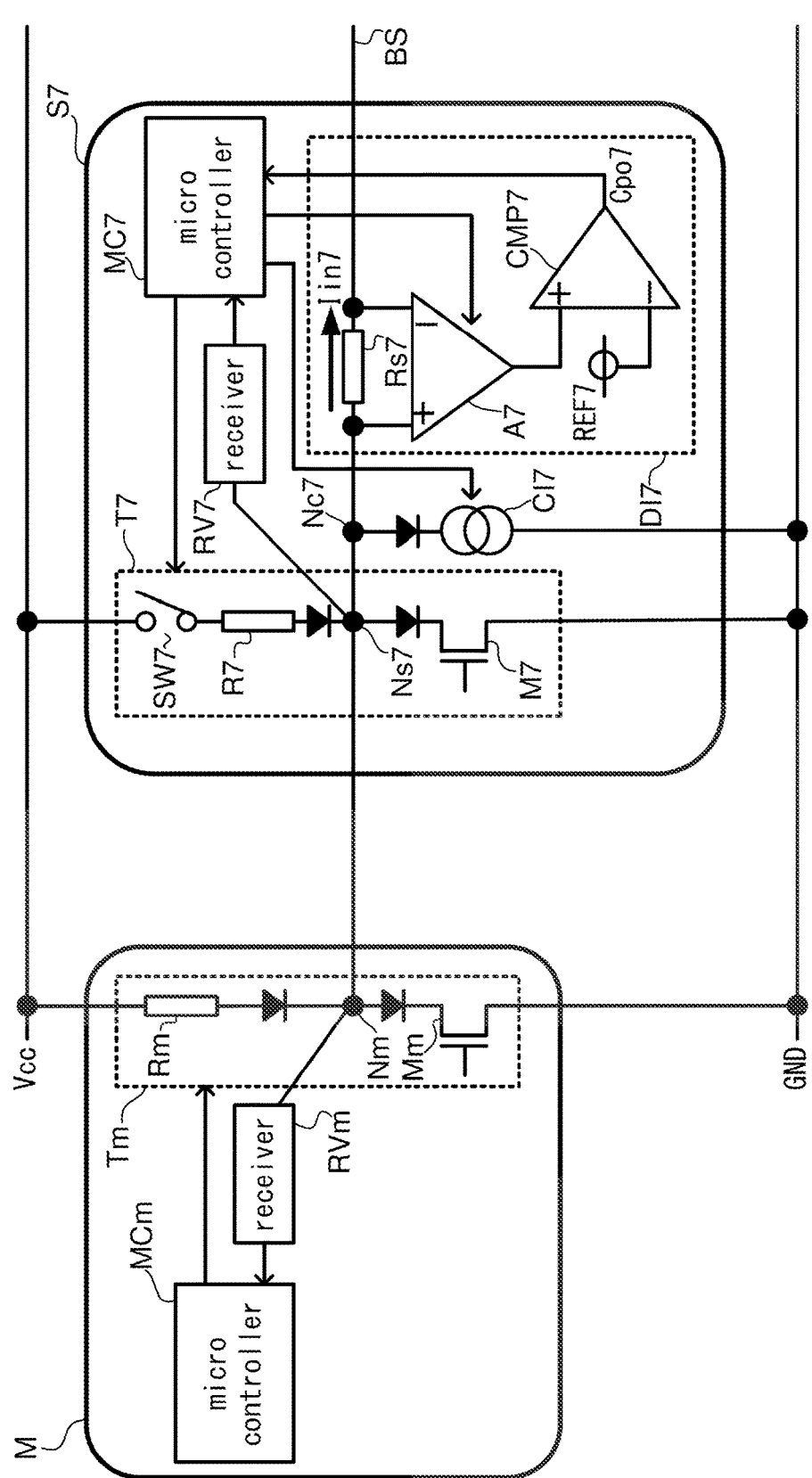
FIG. 2 is a diagram more specifically showing an example of internal configurations of a master and a slave.

Here, FIG. 2 is a diagram more specifically showing an example of internal configurations of the master M and the slave S7. In FIG. 2, the configuration of the slave S7 is illustrated as a representative of the configuration of the slaves, and the other slaves S6 to S1 (of which none is unillustrated in FIG. 2) are all similar to the slave S7 in configuration.

As shown in FIG. 2, the master M has, in addition to the transmitter Tm, a receiver RVm and a microcontroller MCm. Here, instead of the microcontroller MCm, a hard logic circuit or the like may be used. The receiver RVm is connected to the node Nm (the bus BS), and receives signals transmitted from the slaves S7 to S1. The microcontroller MCm controls on/off of the transistor Mm in the transmitter Tm. Further, the microcontroller MCm receives data from the receiver RVm.

As shown in FIG. 2, the slave S7 includes, in addition to the transmitter T7, the constant current supply CI7, the sense resistor Rs7, and the amplifier A7, a receiver RV7, a microcontroller MC7, and a comparator CMP7. Here, instead of the microcontroller MC7, a hard logic circuit or the like may be used.

The receiver RV7 is connected to the node Ns7 (the bus BS), and receives data transmitted from the master M or other slaves. The microcontroller MC7 controls on/off of the transistor M7 in the transmitter T7 and on/off of the switch SW7. Further, the microcontroller MC7 receives data from the receiver RV7.

Further, the microcontroller MC7 controls on/off of the constant current supply CI7, and also controls the current value of the identification current output Iout7 generated by the constant current supply CI7.

A non-inverting input end (+) of the comparator CMP7 is connected to an output end of the amplifier A7. An inverting input end (−) of the comparator CMP7 is connected to an application end of a reference voltage REF7. The comparator CMP7 compares an output of the amplifier A7 with the reference voltage REF7, and outputs a comparator output Cpo7 as a comparison result. The comparator output Cpo7 indicates a result of comparison between the identification current input Iin7 flowing in the sense resistor Rs7 and a predetermined detection threshold value. That is, the sense resistor Rs7, the amplifier A7, and the comparator CMP7 constitute an identification current detection unit DI7 that detects presence/absence of the identification current input Iin7.

3. Address Assignment Process

Next, a description will be given of the process of assigning addresses to the slaves S7 to S1 in the communication system 1, with reference to the flow chart shown in FIG. 3.

Figure 3:
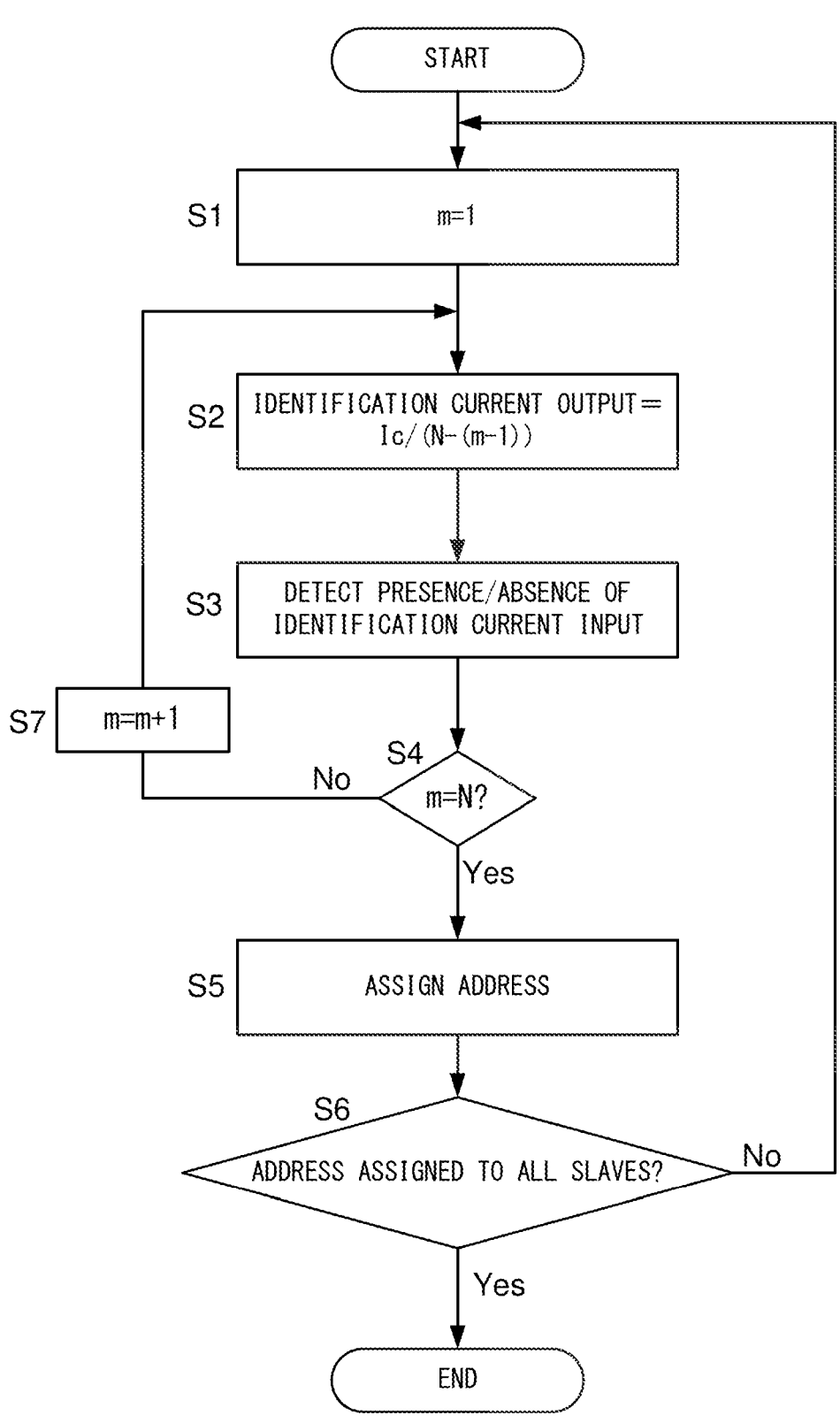
FIG. 3 is a flow chart regarding an address assignment process.

When the procedure indicated by the flow chart shown in FIG. 3 is started, first, in step S1, it is set such that a number of process executions m=1, and the procedure proceeds to step S2. In step S2, by the constant current supplies CI7 to CI1 in the slaves S7 to S1, the identification current outputs Iout7 to Iout1 are generated. Here, the identification current outputs all have the same value, and are set such that the value of the identification current outputs=Ic/(N−(m−1)), where Ic: a predetermined value, N: the total number of the slaves (in the present example, N=7). Accordingly, initially, it is set such that Iout7 to Iout1=Ic/7. Here, in step S2 and in later-described step S3, the transistor Mm in the master M is in an off state, and the switches SW7 to SW1 and the transistors M7 to M1 in the slaves S7 to S1 are in the off state. In short, the pull-up resistors R7 to R1 are disabled.

Thus, in the slaves S7 to S1, the identification current outputs Iout7 to Iout1 flow from the bus BS to a side of the ground potential GND, as a result of which, at each of the sense resistors Rs7 to Rs2, a corresponding one of the identification current inputs Iin7 to Iin2, which each flow from the pre-stage side to the post-stage side, is generated (FIG. 1). Note that, at this time, the current Im drawn out from the master M to the post-stage side is generated as a sum of the identification current outputs Iout7 to Iout1.

In step S3, the identification current detection units DI7 to DI1 in the slaves S7 to S1 each detect presence/absence of a corresponding one of the identification current inputs Iin7 to Iin1. Here, if an identification current input is equal to or larger than the predetermined detection threshold value, the presence of the identification current input is detected. On the other hand, if an identification current input is smaller than the predetermined detection threshold value, the absence of the identification current input is detected. The presence/absence of an identification current input corresponds to whether or not the identification current input is detected. Note that the detection threshold value is the same value for the slaves S7 to S1, and is set to Ic/2, for example.

Next, in step S4, it is determined whether or not the number of process executions m=N (in the present example, 7) holds, and if m<N holds (No in step S4), the procedure proceeds to step S7, and m is increased by 1.

Then, the identification current output in step S2 is executed in the slaves except a slave having had an identification current input detected therein in previous step S3. In a case of m=2, the identification current output=Ic/6 holds. Note that, during process executions repeated until the number of process executions m reaches N (in the present example, 7), a slave having had an identification current input detected therein in step S3 stops the identification current output thereafter.

And, in step S4, a similar process is repeatedly executed as long as m<N holds, and when m=N is achieved (Yes in step S4), the procedure proceeds to step 5. Here, to a slave that has not had an identification current input detected therein until the end (the identification current input<the detection threshold value), an address issued from the master M is assigned. The slave S1, which is on the most post-stage side, is the first slave to have an address assigned thereto.

Next, in step S6, in a case where address assignment with respect to all the slaves has not been completed yet (No in step S6), the procedure returns to step S1, where initialization is done such that the number of process executions m=1, and process similar to the above-described process is performed with respect to the slaves excluding a slave having already had an address assigned thereto. For example, if the slave S1 has already had an address assigned thereto, the process will be executed with respect to the slaves S7 to S2.

Then, when all the slaves (the slaves S7 to S1) have had an address assigned thereto (Yes in step S6), the process is completed.

4. Specific Example of Address Assignment Process

Here, a specific description will be given of the previously-described address assignment process shown in FIG. 3, with reference to FIG. 4 and FIG. 5. FIG. 5 illustrates a process performed after an address has been assigned through the process illustrated in FIG. 4. In each of FIG. 4 and FIG. 5, the horizontal axis is the time axis, and there are illustrated, regarding each of the slaves S1 to S7, in order from the top, a corresponding one of the identification current outputs Iout1 to Iout7, a corresponding one of the identification current inputs Iin1 to Iin 7, and a corresponding one of the comparator outputs Cpo1 to Cpo7. Further, at the bottom in each of FIG. 4 and FIG. 5, the current Im drawn out from the master M to the post-stage side is illustrated. Note that the comparator outputs Cpo1 to Cpo7 each actually rise at timing slightly delayed from timing at which a corresponding one of the identification current outputs Iout1 to Iout7 rises.

Figure 4:
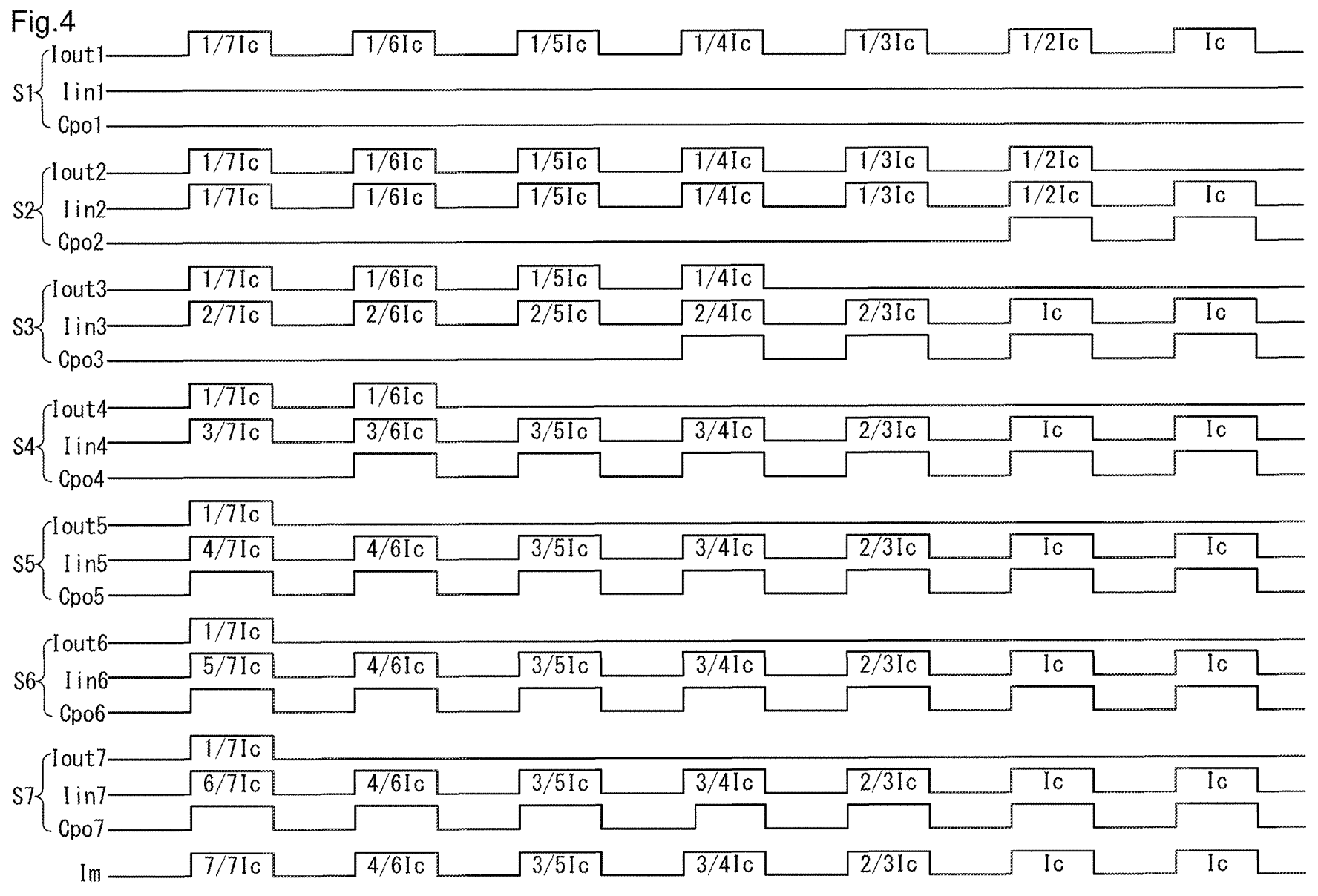

First, when the process shown in FIG. 3 is started (m=1), as illustrated in FIG. 4, in the slaves S7 to S1, the identification current outputs Iout7 to Iout1 are generated, each having a value of $\frac{1}{7}$Ic and a pulse waveform, and the current Im=7/7Ic=Ic holds. At this time, in the slave S7, the identification current input Iin7 having a value of $\frac{6}{7}$Ic flows, such that Iin7≥the detection threshold value (=Ic/2) holds, and thus the comparator output Cpo7 is at high level. Further, in the slave S6, the identification current input Iin6 having a value of $\frac{5}{7}$Ic flows, such that Iin6≥the detection threshold value holds, and thus the comparator output Cpo6 is at high level. Further, in the slave S5, the identification current input Iin5 having a value of $\frac{4}{7}$Ic flows, such that Iin5≥the detection threshold value holds, and thus the comparator output Cpo5 is at high level. On the other hand, in the slaves S4 to S1, the identification current inputs Iin4 to Iin1<the detection threshold value holds, the comparator outputs Cpo4 to Cpo1 are at low level.

Accordingly, in the process (the process shown in FIG. 4) executed until m=7 is achieved, the identification current outputs are stopped in the slave S7 to S5 in which identification current inputs have been detected. In the subsequent second operation of the process (m=2), as shown in FIG. 4, in the slaves S4 to S1, the identification current outputs Iout4 to Iout1 each having a value of $\frac{1}{6}$Ic are generated. At this time, in the slave S4, the identification current input Iin4≥the detection threshold value holds, and thus, thereafter, the identification current output is stopped in the slave S4.

Subsequently, when the process of steps S2 and S3 in FIG. 3 is repeated, the identification current output varies such that $\frac{1}{5}$Ic→$\frac{1}{4}$Ic→$\frac{1}{3}$Ic→$\frac{1}{2}$Ic→Ic. Then, to the slave S1 in which no identification current input has been detected until the end (the comparator output Cpo1=low level), an address is assigned (step S5).

Next, the process starting from step S1 is performed with respect to the slaves S7 to S2 excluding the slave S1 to which an address has been assigned. In the process, as shown in FIG. 5, the identification current outputs having values of $\frac{1}{7}$IC to Ic are sequentially generated, and to the slave S2 in which no identification current input has been detected until the end (the comparator output Cpo2=low level), an address is assigned.

In this manner, according to the present embodiment, Ic is the maximum value of the current flowing in the bus BS, and thus it is possible to suppress the maximum value regardless of the number of slaves.

Figure 6:
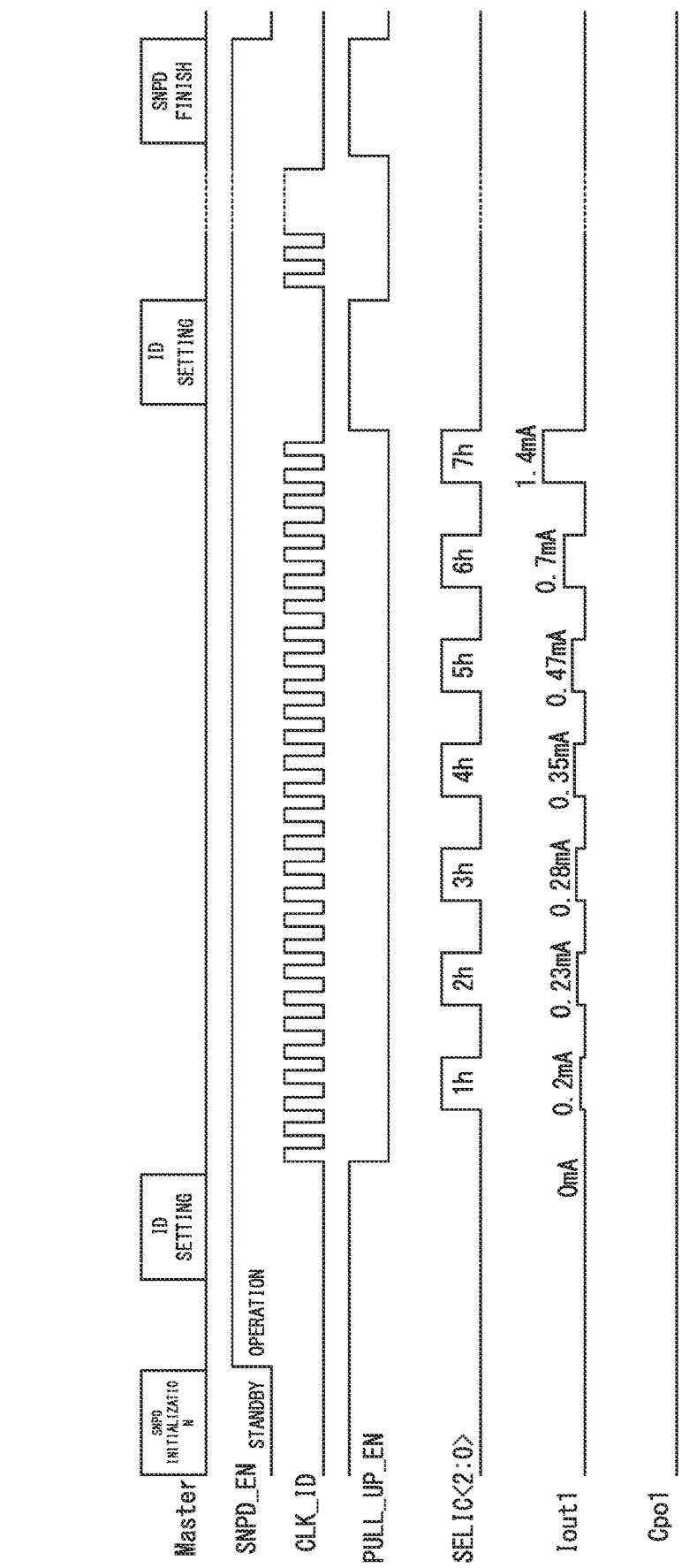
FIG. 6 is a timing chart showing an example of behaviors of various signals in the address assignment process (slave S1).
Figure 7:
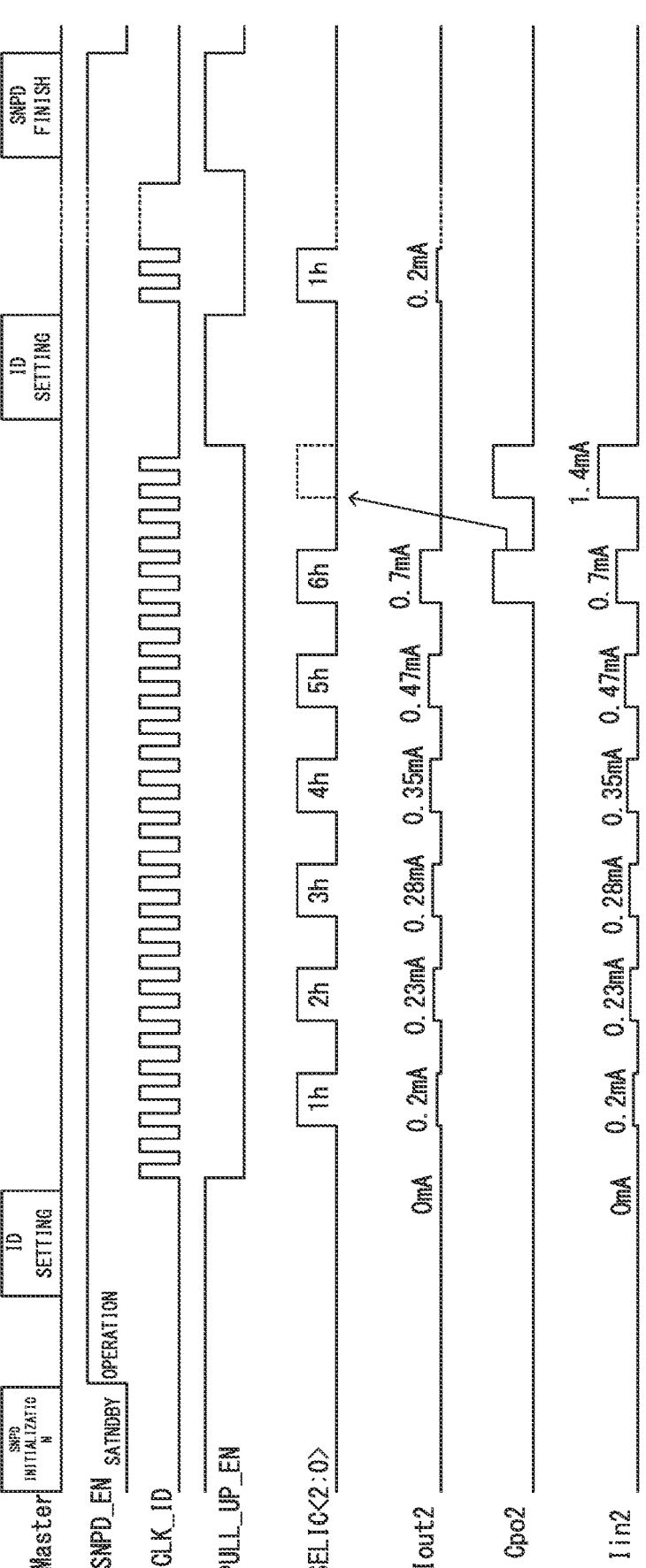
FIG. 7 is a timing chart showing an example of behaviors of various signals in the address assignment process (slave S2).
Figure 8:
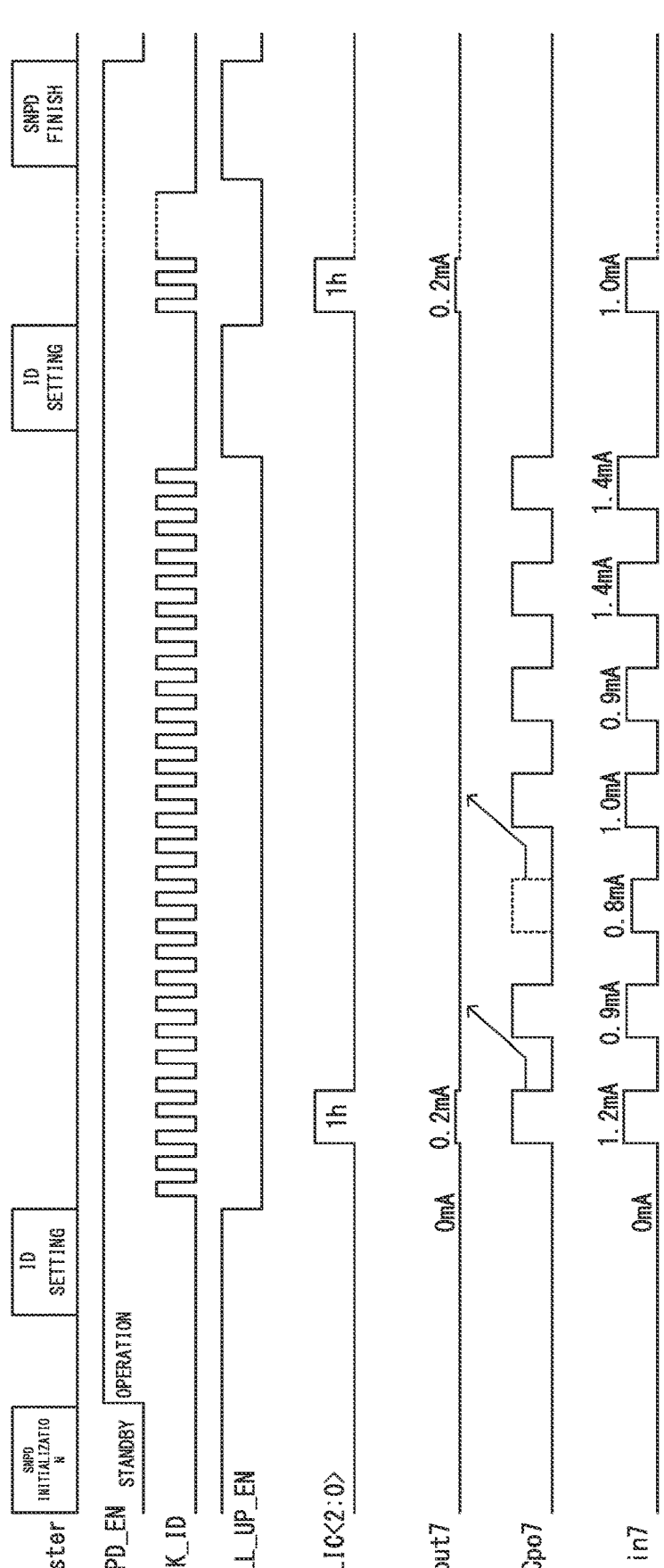
FIG. 8 is a timing chart showing an example of behaviors of various signals in the address assignment process (slave S7).

Further, with reference to FIG. 6 to FIG. 8, a description will be given of an operation example of the address assignment process. FIG. 6 shows an operation example of the slave S1, FIG. 7 shows an operation example of the slave S2, and FIG. 8 shows an operation example of the slave S7. In each of FIG. 6 to FIG. 8, the horizontal axis is the time axis, and there are illustrated, in order from the top, a command transmitted from the master M, an SNPD enable signal, a clock signal, a pull-up enable signal, a SELIC signal, an identification current output, and a comparator output. Note that, in each of FIG. 7 and FIG. 8, an identification current input is illustrated at the bottom.

As shown in FIG. 6, first, the slave S1, upon receiving an SNPD (Slave Node Position Detection) initialization command transmitted from the master M, enables the SNPD enable signal, so as to shift an SNPD circuit from a standby mode to an operation mode.

Thereafter, the slave S1, on receiving an ID (address) setting command transmitted from the master M, disables the pull-up enable signal. Thereby, the switch SW1 is turned off to thereby disable the pull-up resistor R1. Also, generation of the clock signal is started.

Thereafter, by the constant current supply CI1, the identification current output Iout1 is generated with values in order from 0.2 mA to 1.4 mA. Here, however, Ic=1.4 mA, as one example. The identification current output Iout1 is generated in a pulse equivalent to a predetermined number of periods (two periods in the example shown in FIG. 6) of the clock signal, and is controlled by the SELIC signal (three bits). Here, the SELIC signal is a signal that sets the value of an identification current output.

As shown in FIG. 6, before the identification current output Iout1 of 1.4 mA is generated, the comparator output Cpo1 never turns to high level (in other words, the identification current input Iin1 is never detected), and thus an ID (address) is assigned to the slave S1. Subsequently, ID setting commands are sequentially transmitted from the master M, but in the slave S1, to which an address has already been assigned, no generation of the identification current output Iout1 is executed thereafter. Then, the slave S1, upon receiving an SNPD finishing command transmitted from the master M, disables the SNPD signal, so that the SNPD operation finishes.

On the other hand, in the slave S2, as shown in FIG. 7, upon a sixth generation of the identification current output Iout2, the comparator output Cpo2=high level is achieved, and the identification current input Iin2 is detected, so that a seventh generation of the identification current output Iout2 is not executed. Since no ID is assigned to the slave S2, upon receiving an ID transmission command for a second time, the slave S2 generates the identification current output Iout2.

Further, in the slave S7, as shown in FIG. 8, upon a first generation of the identification current output Iout7, the comparator output Cpo7=high level is achieved, and the identification current input Iin7 is detected, so that no generation of the identification current output Iout7 is executed thereafter. At this time, as shown in FIG. 8 as an example, even in a case where the comparator output=low level has been achieved midway, generation of the identification current output is not executed, either. Note that the comparator output becomes low level in a case, for example, where no signal is output due to noise and the like.

Note that the detection threshold value is not limited to Ic/2, but may instead be a value slightly smaller than Ic/2. In that case, even with variation in characteristics, it is possible to almost surely detect an identification current input that is equal to Ic/2 or larger.

Further, in the above embodiment, an address is assigned to a slave that has had no identification current input detected therein until an Nth generation of the identification current output, but this is not meant as a limitation. For example, in a case where the identification current input has been detected in each of all the slaves except a single slave (the slave S1), as at the time of the sixth generation of the identification current output (=$\frac{1}{2}$Ic) shown in FIG. 4, an address may be assigned to the single slave at the time.

Further, in step S2 (FIG. 3), it is not necessarily that N=the number of all the slaves, but it may be that N=the number of the slaves excluding a slave to which an address has been assigned. For example, after an address has been assigned to the slave S1, in the process of step S2, an identification current output is generated such that the identification current output=Ic/6.

5. Modified Example

Figure 9:
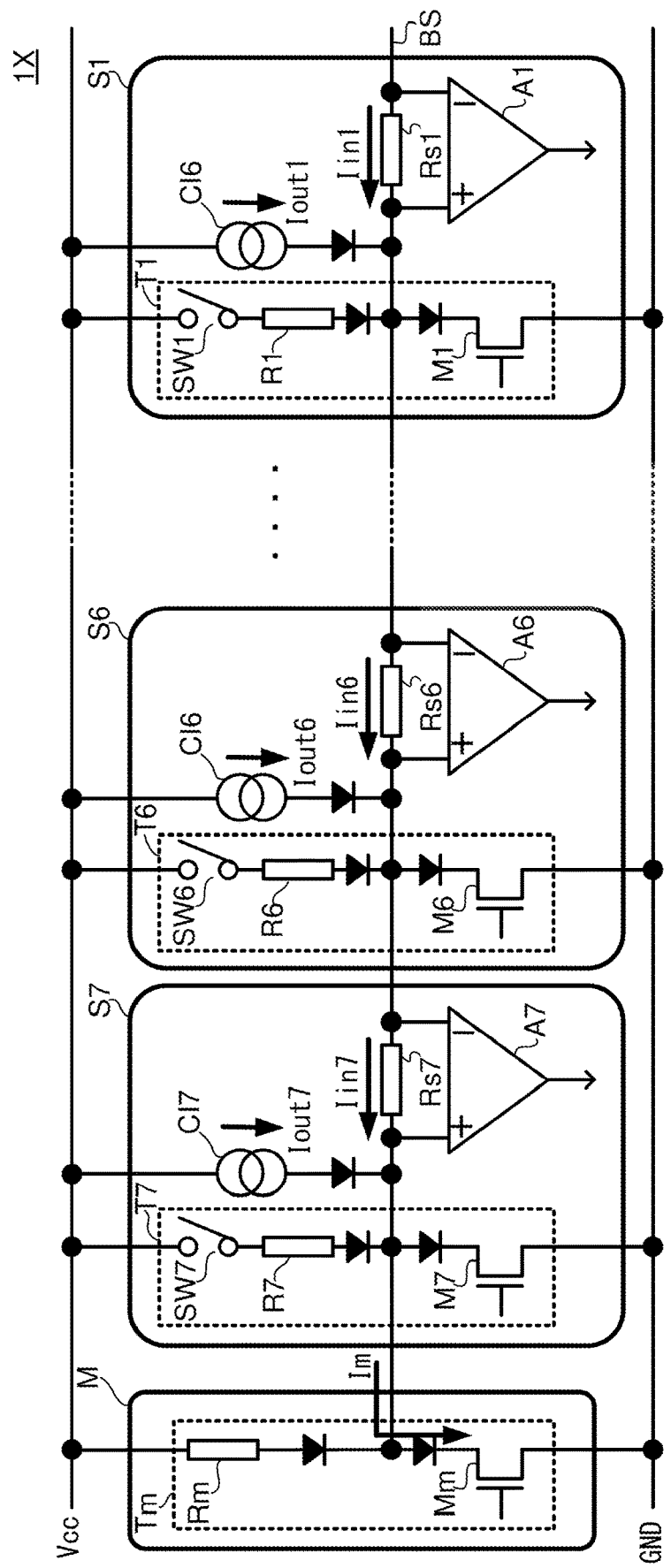
FIG. 9 is a diagram showing a configuration of a communication system according to a modified example.

FIG. 9 is a diagram showing a configuration of a communication system 1X according to a modified example. The communication system 1X has a configuration that is different from that of the above-described embodiment (FIG. 1) in that, in the slaves S7 to S1, the constant current supplies CI7 to CI1 are disposed between the power supply voltage Vcc application end and the bus BS. Here, between each of the constant current supplies CI7 to CI1 and the bus BS, a diode is disposed with its cathode side on the side of the bus BS. According to this configuration, by having the transistor Mm in the master M in the on state when generating the identification current outputs Iout7 to Iout1, the address assignment process can be executed through a process similar to the previously described process. At this time, as shown in FIG. 9, the identification current inputs Iin7 to Iin1 are generated to flow from the post-stage side toward the pre-stage side. Further, the current Im is generated which is drawn into the master M.

6. Modified Example of Identification Current Detection Unit

Figure 10:
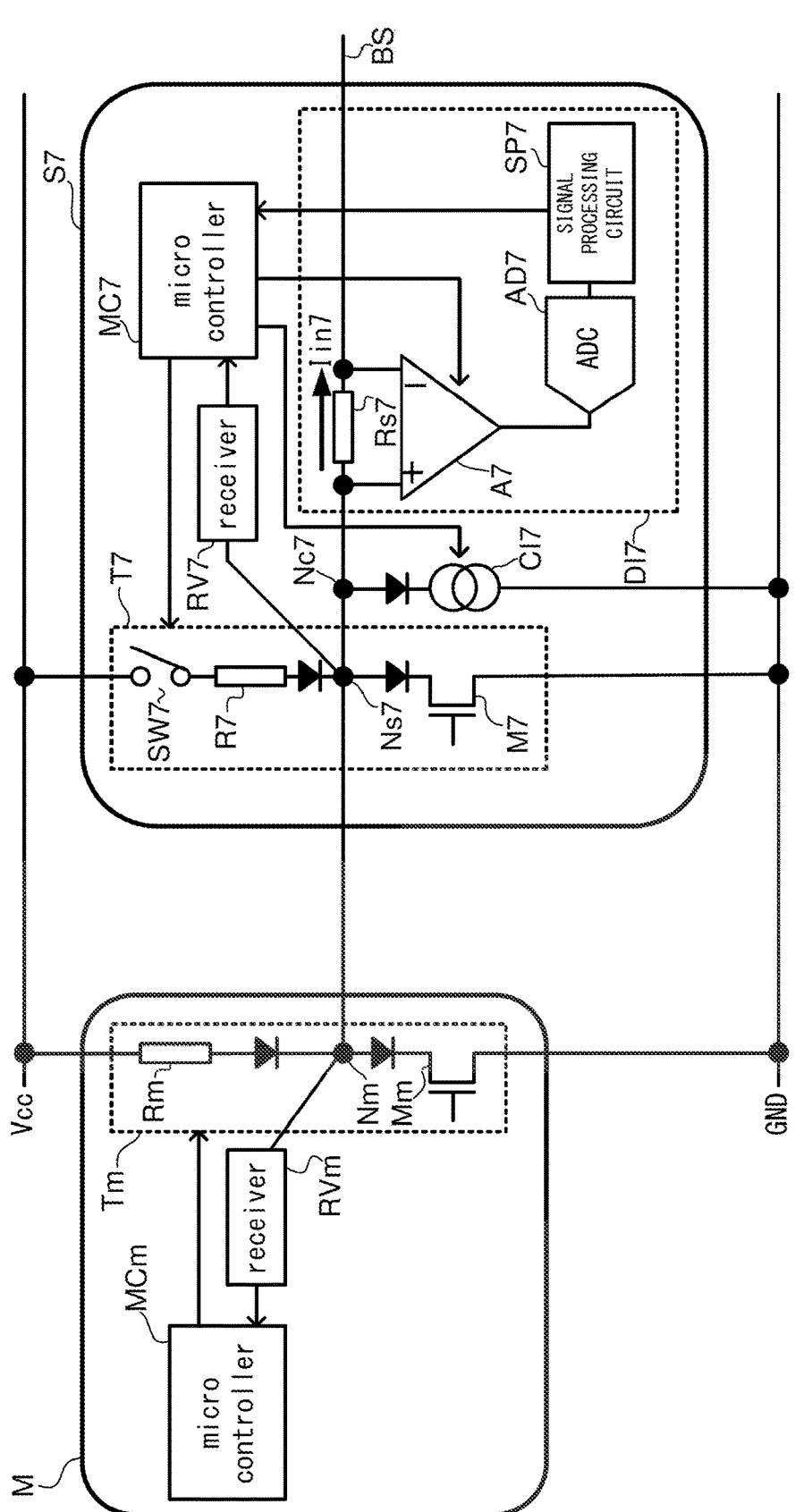
FIG. 10 is a diagram showing an internal configuration of a slave according to the modified example.

FIG. 10 is a diagram showing an internal configuration of the slave S7 that includes a modified example of the identification current detection unit DI7. Note that the configuration of the identification current detection unit DI7 shown in FIG. 10 is also similarly applied to the identification current detection units DI6 to DI1.

In the identification current detection unit DI7 shown in FIG. 10, unlike in the previously-described embodiment (FIG. 2), instead of the comparator CMP7, an AD converter AD7 and a signal processing circuit SP7 are provided. The AD converter AD7 performs A/D (analog/digital) conversion on an output of the amplifier A7. Digital data output from the AD converter AD7 is input to the signal processing circuit SP7. The signal processing circuit SP7, based on the above digital data, detects presence/absence of an identification current input.

More specifically, before the identification current output is generated (before step S2 in FIG. 3), the output of the amplifier A7, with the identification current output=0 mA, is measured by the AD converter AD7, and the measurement result is stored in the signal processing circuit SP7 as an offset. Thereafter, to detect an identification current input, in the signal processing circuit SP7, the above-described offset is subtracted from a value of the output of the amplifier A7 measured by the AD converter 7, and the subtraction result is compared with a threshold value, whereby the presence/absence of an identification current input is detected. In this manner, by cancelling an offset, it is possible to suppress erroneous detection due to the offset.

Figure 11:
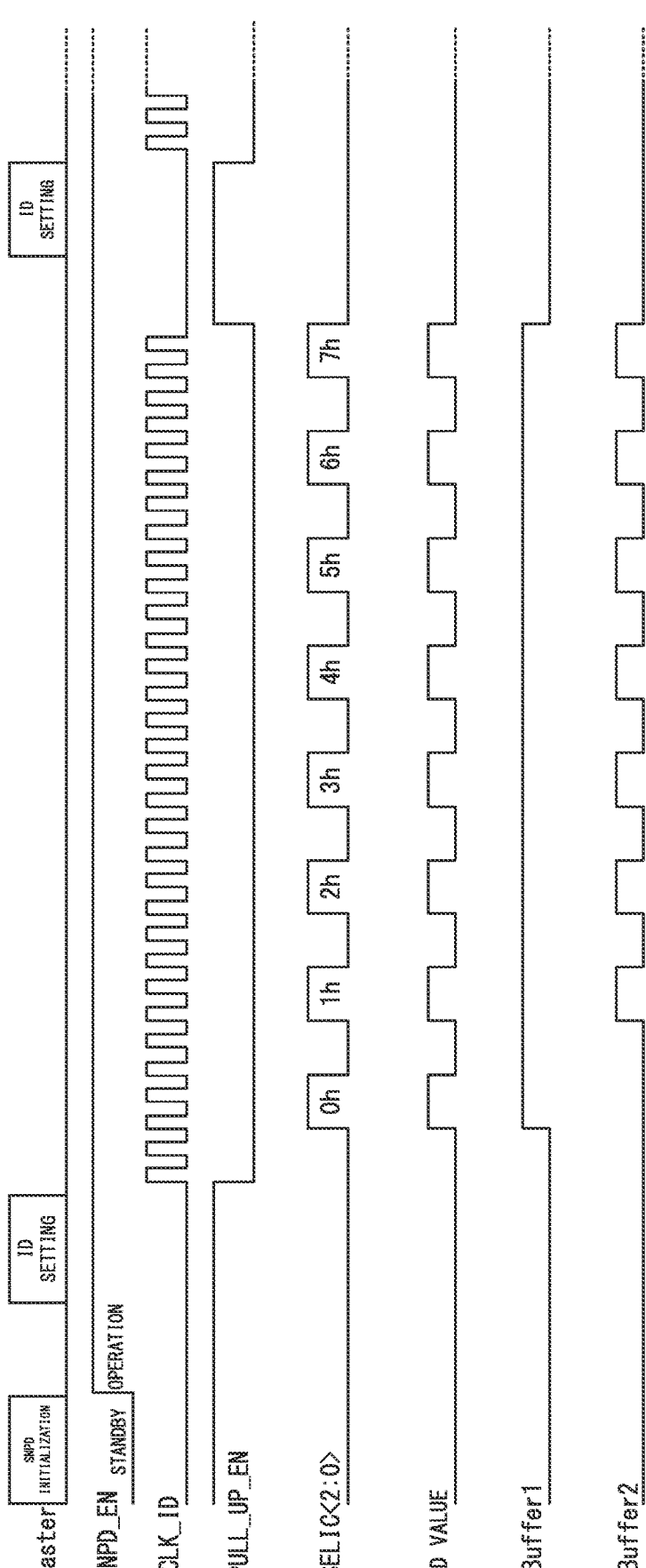
FIG. 11 is a timing chart showing an example of behaviors of various signals during address assignment process according to the modified example (slave S1).

FIG. 11 is a diagram showing an operation example of the address assignment process according to the present modified example, and is a diagram to be compared with FIG. 6 (the slave S1) referred to previously. In FIG. 11, shown in a lower part are an output value of the AD converter AD7 and data stored in a buffer 1 and buffer 2 in the signal processing circuit SP7.

As shown in FIG. 11, before an identification current output is generated, digital data output from the AD converter AD7 with the identification current outputs Iout7 to Iout1=0 mA (0 h) are stored as an offset in the buffer 1. Thereafter, each time an identification current detection operation is performed, digital data output from the AD converter AD7 is stored in the buffer 2, and by comparing a value obtained by subtracting the above-mentioned offset from the stored digital data with the threshold value, the presence/absence of the identification current input Iin1 is detected.

7. Application to Vehicle

Figure 12:
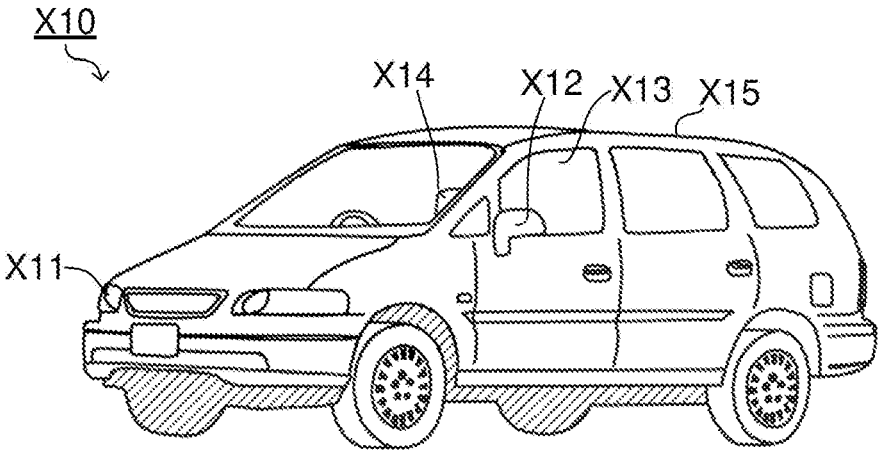
FIG. 12 is an exterior view showing an example of a vehicle.

The hitherto-described communication systems 1 and 1X are applicable to controlling an ultrasonic sonar in a vehicle, for example. In addition, as shown in FIG. 12, they are further applicable, for example, to controlling a light X11, controlling a door mirror X12, controlling a power window X13, controlling a power seat X14, and controlling a roof X15 in a vehicle X10.

8. Others

It should be understood that, with respect to the foregoing embodiments of the present disclosure, various modifications can be made and implemented within the scope not departing from the scope of the present disclosure.

9. Supplementary Notes

As has been discussed above, for example, a communication system (1, 1X) according to the present disclosure includes a control device as a master (M) and a plurality of control devices as slaves (S7 to S1) sequentially connected via a bus (BS) to the master on a post-stage side of the master. Here, the master includes a first transmitter (Tm) including a first pull-up resistor (Rm) and a first transistor (Mm) that are connected in series between an application end of a power supply voltage (Vcc) and an application end of a ground potential (GND), the slaves each include a second transmitter (T7 to T1) including a switch (SW7 to SW1) and a second pull-up resistor (R7 to R1) that are disposed between an application end of the power supply voltage and the bus and a second transistor (M7 to M1) disposed between the bus and the ground potential, a constant current supply (CI7 to CI1) disposed between the bus and the application end of the ground potential or between the application end of the power supply voltage and the bus, and an identification current detection unit (DI7 to DI1) disposed, in the bus, on a post-stage side of a node (Nc7 to Nc1) at which the constant current supply is connected to the bus, the communication system is configured to be capable of executing an address assignment process including a first process for detecting presence/absence of an identification current input by means of the identification current detection unit when the constant current supply has generated an identification current output with the switch and the second transistor in an off state, and a second process for repeatedly executing the first process while, with respect to a slave among the slaves that has had the identification current input detected therein, stopping generation of the identification current output thereafter, and assigning an address to a single slave among the slaves that has not had the identification current input detected therein, and the communication system is also configured to be capable of executing the address assignment process while excluding a slave among the slaves that has had the address assigned thereto (a first configuration).

Further, in the above first configuration, the identification current output may be generated as Ic/(N−(m−1)) (where Ic: a predetermined value, m: a number of process executions, and N: a number of all the slaves) (a second configuration).

Further, in the above first configuration, the identification current output may be generated as Ic/(N−(m−1)) (where Ic:

a predetermined value, m: a number of process executions, and N: a number of the slaves except a slave among the slaves that has had the address assigned thereto) (a third configuration).

Further, in the above second or third configuration, the communication system may be configured to, upon Nth generation of the identification current output, assign the address to a slave among the slaves that has never had the identification current input detected therein before the Nth generation of the identification current output (a fourth configuration).

Further, in the above second or third configuration, in a case where the identification current input has already been detected in the slaves except a single slave among the slaves, the address may be assigned to the single slave at that time (a fifth configuration).

Further, in any one of the above second to fifth configurations, the identification current detection unit may be configured to detect presence/absence of the identification current input based on comparison between the identification current input and a detection threshold value, and the detection threshold value may be equal to or smaller than Ic/2 (a sixth configuration).

Further, in any one of the above first to sixth configurations, the identification current detection unit (DI7 to DI1) may include a sense resistor (Rs7 to Rs1) disposed in the bus, an amplifier (A7 to A1) configured to amplify a potential difference across the sense resistor, and a comparator (CMP7 to CMP1) configured to compare an output of the amplifier with a reference voltage (a seventh configuration).

Further, in any one of the above first to sixth configurations, the identification current detection unit (DI7) may include a sense resistor (Rs7) disposed in the bus, an amplifier (A7) configured to amplify a potential difference across the sense resistor, an AD converter (AD7) configured to perform A/D conversion on an output of the amplifier, and a signal processing circuit (SP7) configured to have an output of the AD converter input thereto, and the signal processing circuit may be configured to store, as an offset, an output of the AD converter obtained when the identification current output=0 mA holds, and to detect presence/absence of the identification current input based on a result of subtracting the offset from an output of the AD converter (an eighth configuration).

Further, in any one of the above first to eighth configurations, the communication system may be compliant with LIN (Local Interconnect Network) (a ninth configuration).

Further, a vehicle according to the present disclosure includes the communication system according to any one of the above first to ninth configurations (a tenth configuration).

INDUSTRIAL APPLICABILITY

The present disclosure is usable in a vehicle, for example.

REFERENCE SIGNS LIST 1,1X communication system
10 communication system
A1 to A7 amplifier
AD7 AD converter
BS bus
CI1 to CI7 constant current supply
CMP1 to CMP7 comparator
DI1 to DI7 identification current detection unit
M master M1 to M7 transistor
MC7 microcontroller
MCm microcontroller
Mm transistor
R1 to R7 pull-up resistor
RV7 receiver
RVm receiver
Rm pull-up resistor
Rs1 to Rs7 sense resistor
S1 to S7 slave
SP7 signal processing circuit
SW11 to SW71 switch
SW1 to SW7 switch
T1 to T7 transmitter
Tm transmitter
X10 vehicle
X11 light
X12 door mirror
X13 power window
X14 power seat
X15 roof

The invention claimed is:

1. A communication system, comprising:

a control device as a master; and a plurality of control devices as slaves sequentially connected via a bus to the master on a post-stage side of the master, wherein the master includes a first transmitter including a first pull-up resistor and a first transistor that are connected in series between an application end of a power supply voltage and an application end of a ground potential, the slaves each include a second transmitter including a switch and a second pull-up resistor that are disposed between an application end of the power supply voltage and the bus and a second transistor disposed between the bus and the ground potential, a constant current supply disposed between the bus and the application end of the ground potential or between the application end of the power supply voltage and the bus, and an identification current detection unit disposed, in the bus, on a post-stage side of a node at which the constant current supply is connected to the bus, the communication system is configured to be capable of executing an address assignment process including a first process for detecting presence/absence of an identification current input by means of the identification current detection unit when the constant current supply has generated an identification current output with the switch and the second transistor in an off state, and a second process for repeatedly executing the first process while, with respect to a slave among the slaves that has had the identification current input detected therein, stopping generation of the identification current output thereafter, and assigning an address to a single slave among the slaves that has not had the identification current input detected therein, and the communication system is also configured to be capable of executing the address assignment process while excluding a slave among the slaves that has had the address assigned thereto.

2. The communication system according to claim 1, wherein
the identification current output is generated as Ic/(N–(m−1)) (where Ic: a predetermined value, m: a number of process executions, and N: a number of all the slaves).
3. The communication system according to claim 1, wherein
the identification current output is generated as Ic/(N–(m−1)) (where Ic: a predetermined value, m: a number of process executions, and N: a number of the slaves except a slave among the slaves that has had the address assigned thereto).
4. The communication system according to claim 2, wherein
the communication system is configured to, upon Nth generation of the identification current output, assign the address to a slave among the slaves that has never had the identification current input detected therein before the Nth generation of the identification current output.
5. The communication system according to claim 2, wherein
in a case where the identification current input has already been detected in the slaves except a single slave among the slaves, the address is assigned to the single slave at that time.
6. The communication system according to claim 2, wherein
the identification current detection unit is configured to detect presence/absence of the identification current input based on comparison between the identification current input and a detection threshold value, and

14 the detection threshold value is equal to or smaller than Ic/2.
7. The communication system according to claim 1, wherein
the identification current detection unit includes
a sense resistor disposed in the bus,
an amplifier configured to amplify a potential difference across the sense resistor, and
a comparator configured to compare an output of the amplifier with a reference voltage.
8. The communication system according to claim 1, wherein
the identification current detection unit includes
a sense resistor disposed in the bus,
an amplifier configured to amplify a potential difference across the sense resistor,
an AD converter configured to perform A/D conversion on an output of the amplifier, and
a signal processing circuit configured to have an output of the AD converter input thereto, and
the signal processing circuit is configured to store, as an offset, an output of the AD converter obtained when the identification current output=0 mA holds, and to detect presence/absence of the identification current input based on a result of subtracting the offset from an output of the AD converter.
9. The communication system according to claim 1, wherein
the communication system is compliant with LIN (Local Interconnect Network).
10. A vehicle comprising the communication system according to claim 1.

* * * * *